May 22, 1962 R. S. SIMONS 3,035,489
METHOD AND MEANS FOR CONTROLLING BRIGHTNESS
AND DEPTH OF FOCUSED IMAGES
Filed April 16, 1958 2 Sheets-Sheet 1
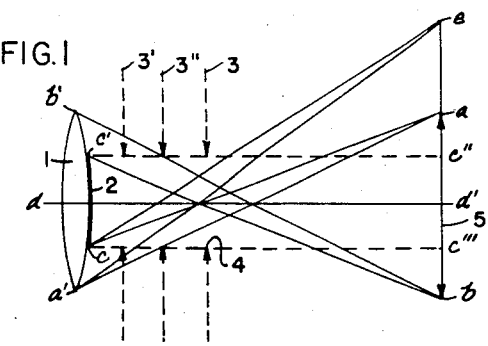
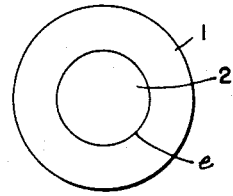
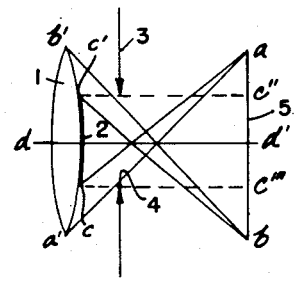
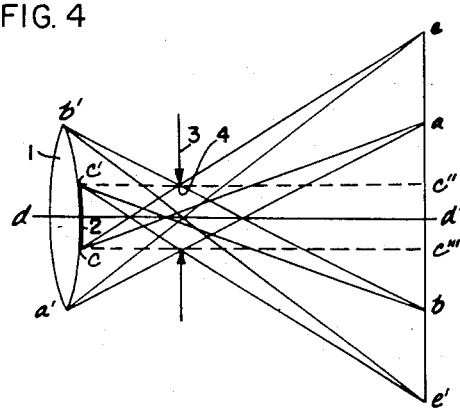
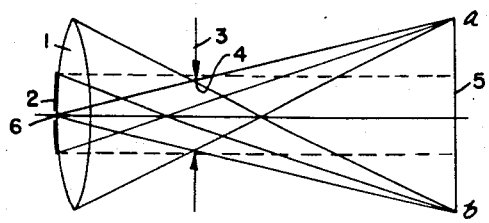
INVENTOR:
RAYMOND S. SIMONS
BY
ATT'YS May 22, 1962 R. S. SIMONS 3,035,489
METHOD AND MEANS FOR CONTROLLING BRIGHTNESS
AND DEPTH OF FOCUSED IMAGES
Filed April 16, 1958 2 Sheets-Sheet 2

INVENTOR:
RAYMOND S. SIMONS
BY
ATT'YS

United States Patent Office 3,035,489
Patented May 22, 1962

3,035,489
METHOD AND MEANS FOR CONTROLLING BRIGHTNESS AND DEPTH OF FOCUSED IMAGES
Raymond S. Simons, 306 Roger Williams, Highland Park, Ill., assignor of fifty-five percent to American National Bank & Trust Company of Chicago, Chicago, Ill., trustee, and five percent to Samuel R. Wittelle, Highland Park, Ill.
Filed Apr. 16, 1958, Ser. No. 728,895
11 Claims. (Cl. 88—57)

This invention concerns image forming lens systems and particularly improvements in lens systems, for use in photography and related arts, whereby a universal depth of field and a substantial depth of focus is obtained.

The main objects of this invention are to provide an improved lens system having an increased light gathering power and greater image brightness while establishing and maintaining a universal depth of field and sharp definition of the image formed by the lens system, to provide a lens system whereby such results may be obtained with relatively simple and low cost lenses and associated equipment; to provide an improved method and means for image brightness control which operates without affecting image sharpness and depth of field; to provide such a method that is better adapted for fully automatic image brightness control; to provide an improved means for obtaining a universal depth of field and a substantial depth of focus with a lens of relatively short focal length and throughout the full range of lens openings; to provide such a means that will provide a universal depth of field with any focusing means and at any ratio of focal length to effective opening area thereof; and to provide an improved system of photography having a depth of field comparable to the camera obscura but with a greatly multiplied speed or brightness of image at the image plane.

The principles of this invention as applied to a photographic lens system are illustrated by the accompanying drawings, wherein:

FIGURE 1 is a diagrammatic elevational view illustrating one form of the invention.

FIG. 2 is a face view of the lens of FIG. 1.

FIG. 3 is a view similar to FIG. 1 but showing the relation of the elements with a lens having a focal length equal to the effective lens diameter.

FIG. 4 is a view similar to FIG. 1 but illustrating the effect of decreasing the mask size.

FIG. 5 is a view similar to FIG. 1 but showing the mask applied to the front side of the lens.

Figure 6:
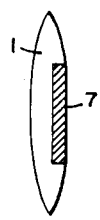
FIG. 6 is a view in sectional elevation showing a lens with a centrally mounted photoelectric cell substituted for the mask of FIGS. 1 to 4.

The primary concept of this invention rests upon the proposition that by blocking off from the image plane all light rays transmitted by a focusing system which would not intersect the optical axis of the system on the image side thereof before passing beyond the image plane, an image can be produced in which substantially every point in the image will be in sharp focus regardless of the distance of the image origin from the focusing element of the system; and resides in the discovery that this result may be obtained by masking the central portion of the focusing element of a lens system with an opaque member of less area than the focusing element and providing a screen, between the mask and the focal or image plane, of greater area than the focusing element and having an annular aperture concentric with the optical axis of the element and of an area substantially equal to and not greater than that of which the axially projected area will fall wholly within the area of the mask.

In the embodiment illustrated in FIG. 1 the principal components for the practice of this invention in the manner shown comprise a focusing means in the form of a lens element 1 of the focusing type, which in a multiple element lens system would be the innermost or rear element, an opaque mask 2 of annular shape mounted concentrically with the optical axis of the lens 1 and on the inner side thereof, a screen 3 suitably mounted behind the lens for movement toward and away from the lens along its optical axis and having an aperture 4 concentric with the mask 2, and a focal plane or image surface 5 located at the principal focus of the lens 1 and on which the desired image of the subject is formed.

The lens element 1 may be a simple, single element, focusing lens or the focusing element of a compound lens and in the arrangement of FIG. 1 should be mounted in fixed precisely focused relation with the image surface or plane 5. Preferably the lens element 1 will be constructed with a relatively short focal length, that is, from one to two times the effective lens diameter; however, the effective lens diameter, the focal length of the lens, and the area of image coverage on the focal or image plane are all variables which are determined by the design of the structure housing the system, for example a camera body, the desired size of the image or picture to be formed, and the mechanics involved in the manual or automatic image brightness control means, as will be hereinafter explained.

As used herein the terms "effective lens opening" or "effective opening" shall be understood to mean width of the actual area of the lens from which transmitted light rays, originating from the subject, are permitted to reach the image or focal plane; the term "effective area" shall mean the total area of the lens which transmits light rays actually reaching the image plane; and the terms "effective diameter" or "effective lens diameter" shall be understood to mean the maximum diameter of that portion of the lens area from which light rays can be transmitted to reach the image plane regardless of their origin. The "image plane" is that plane at which the desired image is formed.

The mask 2, which provides an opaque area concentric with the axis of the lens 1, may be a thin disc applied to the surface of the lens, as in FIG. 1, or any other suitable means by which the central area of the lens is rendered ineffective to transmit light rays to the image plane.

The size of the mask 2 in relation to the effective diameter of the lens 1 is determined by several variable factors incident to the design of the camera or other apparatus in which the system is used, as will be hereafter explained. However, regardless of the mask size and shape its principal function is to block out the central portion of the lens, so the only the marginal area of the lens is effective, and to coact with the screen 3 to admit substantially only those rays from the subject which can intersect the optical axis behind the lens. Another function of the mask is to coact with the screen to control or vary the brightness of the image at the image plane.

The screen 3 is an opaque member disposed transversely of the lens or optical axis between the lens and the focal plane and should be of an area size sufficient to intercept all light rays transmitted by the lens that are capable of reaching the desired image area, except those passing through the aperture 4. This screen may be mounted by any suitable means so as to be shiftable along the lens axis toward and away from the lens; and any suitable manual or automatic means, not shown, may be provided for shifting the screen.

In the form shown, the aperture 4 in the screen 3 is made concentric with the area center of the mask 2 and the edge of the opening is preferably made thin and sharp since its operative function is to provide a sharp cut-off of lens transmitted light rays passing toward the focal plane. In any event the diameter of the aperture 4 must not be greater than the smallest radial dimension of the mask 2 and preferably the aperture 4 is only so much smaller in size than the mask 2 as to make certain that no light rays transmitted parallel with the lens axis from the edge of the mask can reach the image plane. Also the axially projected area of the aperture 4, on a plane normal to the optical axis, is preferably a perfect circle.

It will now be seen that, as illustrated in the accompanying drawings, the screen 3 with its aperture 4 coacts with the mask 2 to intercept or block-off substantially all right rays transmitted by the lens 1 which do not intersect the optical axis of the lens in the image zone; and that the effective lens opening is determined by the axial spacing of the screen from the mask. Thus, in the form or arrangement of FIGS. 1 to 4 inclusive, the effective lens opening and hence the brightness of the image may be varied between zero and maximum by merely shifting the screen 3 toward or away from the mask 2, or vice versa. No light rays will pass through the mask-screen combination of the screen 3 and the mask 2 lie in substantially the same plane. As the distance is increased between the mask and the screen by shifting one away from the other along the optical axis, the brightness of the image gradually gains in magnitude. It is to be noted, however, that with regard to the maximum distance of screen 3 from lens 1, an important factor has to be considered. As seen, e.g., in FIG. 4, light rays $b'$—$b$, $b'$—$e'$, $c'$—$b$, $c'$—$e'$, $c$—$e$, $c$—$a$, $a'$—$e$ and $a'$—$a$, after being transmitted by lens 1 and by-passing mask 2, across the optical axis $d$—$d'$, then pass beyond the axially projected area (represented by broken lines $c'$—$c''$, $c$—$c'''$) of aperture 4 and reach, unobstructed, the image plane. If the screen 3 is moved farther away from the lens 1, its opaque portion would block off light rays useful in producing the image. Thus, first the rays $c$—$e$ and $c'$—$e'$ would be cut off; with further shift of the screen, the rays $a'$—$e$, $b'$—$e'$, then $c$—$a$, $c'$—$b$ and finally $a'$—$a$, $b'$—$b$ would be eliminated from the image due to the undesirable blocking action of screen 3. Therefore, in order not to cut off useful rays, the screen 3 should not be moved past the point closest to the focusing lens 1, where the rays, after crossing the optical axis $d$—$d'$, first pass beyond the axially projected area of aperture 4. According to the figures, the projected area of the mask 2 and that of aperture 4 coincide, since the two areas are identical in magnitude. It is obvious that a smaller aperture would have a projected area represented by two axially parallel lines falling inside broken lines $c'$—$c''$ and $c$—$c'''$.

As shown in FIG. 1 the image $a$—$b$ is intended to represent one produced by a lens 1 having an effective diameter $a'$—$b'$, ground to have a focal length equal to twice the effective lens diameter and to produce a maximum image dimension at the focal plane equivalent to the effective lens diameter. The mask 2 is applied directly to the rear or inner surface of the lens 1 concentric with the lens axis and the mask diameter is one-half the effective diameter of the lens. The screen 3 is mounted rearwardly of the lens 1 for adjustment along the lens axis toward and away from the mask 2, and the aperture 4 is concentric with the lens axis and of the same diameter as the mask 2.

Thus the maximum effective opening of the lens 1 is that space between the edge $c$ of the mask 2 and the outer periphery of the lens, as at $a'$ or $b'$, and the maximum amount of light that can reach the image $a$—$b$ is represented by the area between the rays $a'$—$a$ and $c$—$a$, or between the diametrically opposite rays $b'$—$b$ and $c'$—$b$. Also it will be seen from FIG. 1 that substantially only those rays which intersect the optical axis $d$—$d'$, in the image zone will pass the screen 3 through the aperture 4. Some light rays emanating from the subject, at or near the optical axis of the system will pass from the lens through the aperture 4 and reach the image plane from around the entire periphery of the mask 3, however in general only those rays emanated by the subject which do not cross the optical axis of the system on the forward side of the lens will pass the screen 3 and reach the image plane. In any event the image is always inverted, or rotated 180°, with respect to the subject and any point in the area of the subject will appear in the image at a diametrically opposite location with respect to the system axis $d$—$d'$.

As indicated in FIG. 1, the position of the screen 3 for maximum illumination of the image $a$—$b$ will be rearwardly of the intersection of the ray cone, defined by the rays $a'$—$a$ and $b'$—$b$, with the rearwardly projected area of the mask 2, indicated by the broken lines $c'$—$c''$, $c$—$c'''$, and it will be apparent that movement of the screen 3 toward the mask and into the said ray cone will cause a narrowing of the cone base, as indicated by the screen position 3', and hence a decrease in the effective opening area of the lens and the amount of light reaching the image plane in the same manner as though the screen were fixed at its maximum open position and a conventional iris diaphragm were mounted directly behind the lens and utilized to peripherally vary the lens opening diameter. It will also be apparent that the same result can be obtained by moving the mask 2, along the axis of the aperture 4, toward the screen. In that case, however, the cone base would retain the same outside diameter and the decrease of its area would be from the inside outwardly.

Thus as the screen 3 approaches the mask 2, or vice versa, the light volume, and hence image brightness, decreases progressively until the edge of the screen opening abuts the mask, at which point all illumination of the image plane is cut off. Also, because the lens 1 is a focusing lens, and since the aperture 4 is not any greater in size than the mask 2 so that light rays transmitted by the lens which can not intersect the optical axis of the system on the image side of the lens are blocked off from the image plane, the illumination of the image plane for any effective lens opening is uniform over the entire picture area and the intensity of this illumination is varied in proportion with change of the effective lens opening as determined by axial spacing of the screen 3 and the mask 2.

Because, in the system of the present invention, it is not necessary to resolve rays, at the image plane, which, originating at any single point in the subject area, pass through the lens on both sides of the optical axis, it is possible to use relatively simple lens designs which are much less costly than those heretofore employed to obtain comparable lens speeds. Also much larger lenses can be used because the added cost of manufacture, due to increased size, is negligible. However, for ordinary photographic purposes, the increase of lens size for use with the present invention is relatively small for the advantages obtained. For example, an ordinary 50 mm. $f$.2 lens has substantially a one inch effective diameter whereas a 50 mm. lens as used with this invention and having a ¾ inch diameter mask applied to its center would only have to be approximately 1¼ inches in diameter to have the same effective opening area. However, because the screen blocks-off a portion of the rays that would otherwise be transmitted, the actual effective diameter of the lens for the present invention should be increased to approximately 1⅜ inches to equal the maximum speed of the ordinary one inch diameter 50 mm. lens.

The size of the mask 2, and hence the diameter of the screen aperture 4, is governed by several factors which enter into the mechanical design of the apparatus in which the present invention is embodied. These factors are (1) the extent of screen movement for a predetermined amount of image brightness change, i.e. sensitivity, (2) the effective lens diameter in relation to the focal length of the lens, (3) the size of the image desired at the focal plane, and (4) the maximum image brightness desired from a given brightness of the illumination source.

In general, and for any predetermined focal length, the smaller the diameter or area of the mask 2 relative to the effective diameter of the lens the greater will be the illumination of the image formed at the surface 5 by a given amount of light emanating from the source. This is because of the increase of the angle between the border rays $b'$—$b$ and $c'$—$b$ as will be apparent from a comparison of FIGS. 1 and 4. However, since the diameter of the screen aperture 4 must not be greater than the diameter of the mask 2, so that the projected area of the aperture 4 onto the lens 1 will fall wholly within the area of the mask 2, the smaller the mask the greater will be the extent of axial movement of the screen for full variation of the effective opening of the lens 1. This, of course, will result in a mechanical problem with respect to the construction of the drive, either manual or automatic, for varying the screen and mask spacing from wide open to full closed condition. This again will be apparent from a comparison of the distance between the mask and the screen positions $3''$ and 3 in FIGS. 1 and 4 respectively.

FIG. 3 compared to FIG. 1 shows the effect of shortening of the focal length of the lens with respect to an image $a$—$b$ and a mask 2 of a predetermined size. As shown in FIG. 3 shortening of the focal length of the lens results in a greater angle, relative to the lens axis, of the border rays $b'$—$b$ and $c'$—$b$ and hence a much shorter extent of movement of the screen 3 from the point where it begins to intersect the rays $b'$—$b$ to the fully closed position against the mask 2. Thus the general rule is that the longer the focal length of the lens in relation to an image and mask of predetermined size, the greater will be the extent of movement of the screen 3 for any predetermined amount of image brightness change.

Another factor to be considered is the relation of image size to focal length, and in this regard it may be stated that the larger the image for any given focal length the smaller will be the extent of movement of the screen for any predetermined amount of image brightness change. This is shown in FIGS. 1 and 4 by the rays $a'$—$e$ and $c$—$e$, which represent the border rays for an image having a maximum dimension equal to the focal length of the lens, and the relation of the screen 3 thereto.

FIG. 5 shows a modification of the present invention wherein the mask 2 is applied to the front surface of the focusing lens element. Ordinarily, with this arrangement accurate control of small light values cannot be obtained because a point shadow of the mask 2 may appear in the image. This can be corrected however, by providing a small aperture 6 at the axis of the lens 1, and of a size which will produce just sufficient illumination at the center of the image to cancel out the shadow of the mask 2.

Figure 7:
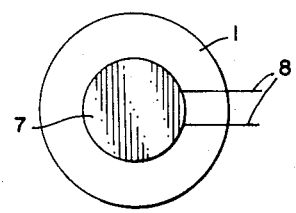
FIG. 7 is a face view of the same.

FIGS. 6 and 7 are intended to show an arrangement where the masking of the lens 1 is accomplished by means of a photo-electric cell 7 that has been in-set into the rear face of the lens 1. In this arrangement it is preferred that the photo cell 7 be in-set into the lens so that its rearward edge will be substantially coincident with the rearward surface of the lens. In this arrangement the fine wires or leads 8, from the cell to the milliammeter or light meter motor, extend directly across the rear face of the lens 1. These wires do not appear in or materially affect the image produced by the effective area of the lens.

A particular and novel result of this combination of a lens and a centrally disposed light meter cell on the rearward side of the lens resides in the fact that the light influencing the cell is restricted to the rays emanating from the object of which the desired image is to be formed. Also, the photo cell is influenced by the same light values that affect the film or emulsion on which the image is to be formed and the meter, therefore, registers the correct scene brightness and does not have to be corrected for extraneous light that is outside of the range of the lens as in the case of ordinary light meter use.

Figure 8:
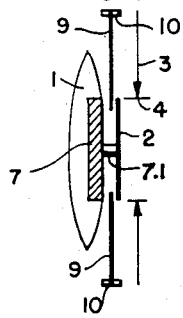
FIG. 8 is an elevational view of a lens, mask, and screen arrangement combined with means for varying the effective lens opening without moving the screen.
Figure 9:
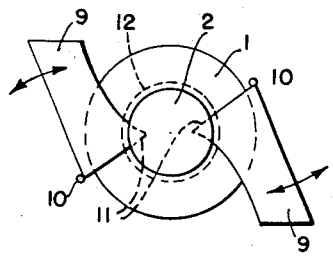
FIG. 9 is a face view of the arrangement of FIG. 8 showing one form of the effective opening control means therefor.

FIGS. 8 and 9 illustrate an arrangement of the present invention wherein the effective area of the lens may be adjustably controlled for variations of scene brightness by means other than relative axial movement of the screen and the mask. With this arrangement, for example, the screen 3 can be adjusted for various positions of maximum effective opening area of the lens according to emulsion speed so that automatic control of the effective lens opening can be had by photo cell means without the necessity of employing a correction factor for the photo cell output to accommodate changes of film or emulsion rating.

As shown in FIGS. 8 and 9 the axial arrangement of the lens 1, mask 2 and screen 3 are like that shown in FIG. 1. The mask 2, however, is mounted on the lens or, as shown, on the back side of the photo cell 7, by a pedestal 7.1 so as to be spaced rearwardly of the lens, and the screen 3 is shown set close to the mask 2 as may be the case when a high speed film is used. Mounted between the lens and the mask 2 are a plurality of secondary masking blades 9, each pivoted to swing between the lens and the mask on an axis 10 located adjacent but outside of the periphery of the lens 1. These masking blades 9 are rotatable about their respective pivots so as to swing toward and away from the center of the lens 1, in a plane normal to the lens axis, and each blade is formed with one or more inwardly projecting teeth 11 of suitable size and shape such that as the blades are swung toward the center of the lens the teeth will block out a progressively greater portion of the effective opening area. Preferably the teeth 11 will be so shaped that the ratio of the area they mask and the normal effective opening area provided by the mask and screen, will be the same regardless of the radial width of the effective opening.

Thus movement of the blades 9 toward or away from the center of the lens will vary the actual effective opening of the lens to adjust for scene brightness and with the blades actuated by a light meter such adjustment will be automatic. It will be understood, of course, that with this arrangement the blade adjustment may be manual and the screen adjustment may be made by the light meter, or, if desired, that both the blades and screen may be adjusted manually.

Figure 10:
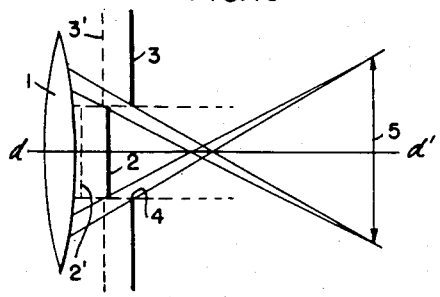
FIG. 10 is an elevational diagrammatic view of a lens, mask, and screen combination wherein the mask is carried by the screen.
Figure 11:
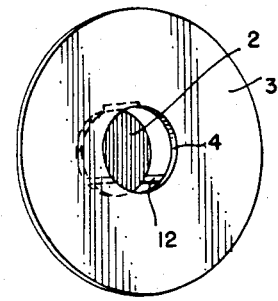
FIG. 11 is a perspective view of the arrangement of FIG. 10.

FIGURES 10 and 11 illustrate an arrangement where the mask 2 and the screen 3 are connected together as a single movable unit with the mask in fixed spaced relation with the screen, as shown in FIG. 11 where the mask is supported from the screen by the posts 12. With this arrangement the effective opening of the lens will be of a substantially constant dimension and the total effective opening area will vary according to the distance between the mask-screen assembly and the lens. This is because the included angle between the border rays passing between the mask and screen remains substantially constant while the border rays themselves intercept the lens at different distances radially from the optical axis depending upon the distance of the mask-screen assembly from the lens. Thus since the border rays intercept annular segments of the lens the total effective opening area will vary substantially with the square of any variation of the mean diameter of the effective opening and according to any change, plus or minus, of the distance between the screen and the lens.

One of the advantages of the fixed mask-screen arrangement of FIGS. 10 and 11 is that the space between the mask 2 and the plane of the screen aperture 4 may be set to provide a border-ray included angle equivalent to that obtained from an $f.22$ aperture, or smaller, for sharpness of image detail, and yet provide image brightness control over a wide range, from that equivalent to $f.3.5$, or faster, depending upon the size of the lens and the maximum effective opening diameter. Thus, image detail, like that obtained with the camera obscura, can be had at a very greatly increased speed of exposure time.

The main advantages of this invention reside in its ability to produce sharpness of image detail at speeds heretofore considered impossible; and in its ability to provide substantially universal focus, or greatly increased depth of field, without material loss of image detail, with a fixed lens to image-plane relation. Other advantages are to be found in that relatively simple lenses may be used to obtain the desired results and where lens correction is required such correction may be considerably less than that needed in lenses for conventional use; and in the fact that the present invention is more readily adaptable to fully automatic exposure control than the conventional systems and apparatus now in use.

Although several methods and apparatus arrangements for the practice of this invention are herein shown and described, it will be understood that details of such methods and apparatus may be altered or omitted without departing from the spirit of this invention as defined by the following claims.

I claim:

1. The method of controlling the brightness of an image formed by an image focusing means transmitting rays of constant intensity while maintaining a universal depth of field and substantial depth of focus which comprises blocking the transmission of rays from a concentric portion of the focusing means by means of a mask member, screening from the image the transmitted rays passing the mask but not converging toward and intersecting the axis of the focusing means on the image side thereof so as to form a hollow ray cone passing through the aperture of a screen member positioned between said mask member and the point closest to the focusing means where rays transmitted thereby first pass beyond the axially projected area of said aperture after crossing the axis of the focusing means, said aperture being axially aligned with and of an area not greater than the area of said mask member and varying the effective area of the focusing means by shifting at least one of said members between said point and said focusing means.

2. The method of controlling the brightness of an image formed by an image focusing means transmitting rays of constant intensity while maintaining a universal depth of field and substantial depth of focus comprising blocking the transmission of rays from the central portion of the focusing means with a mask disposed on the inner side of the focusing means and concentric therewith, screening from the image those transmitted rays passing the mask which do not converge toward and intersect the axis of the focusing means of the image side thereof so as to pass through an aperture of a screen, said aperture being axially aligned with and of an area not greater than the area of the mask, and shifting the position of the screen between said mask and the point closest to the focusing means where rays transmitted thereby first pass beyond the axially projected area of said aperture after crossing the axis of the focusing means to vary the maximum angle between said axis and the rays passing through said aperture.

3. The method of controlling the brightness of an image formed by an image focusing means transmitting rays of constant intensity while maintaining a universal depth of field and substantial depth of focus which comprises blocking the transmission of rays from a concentric portion of the focusing means with a centrally punctured mask member disposed on the outer side of the focusing means and concentric therewith, screening from the image those transmitted rays passing beyond the periphery of the mask which do not converge toward and intersect the axis of the focusing means on the image side thereof so as to pass through an aperture of a screen, said aperture being axially aligned with and of an area not greater than the area of said mask member, and shifting the position of the screen between said focusing means and the point closest to the focusing means where rays transmitted thereby first pass beyond the axially projected area of said aperture after crossing the axis of the focusing means to vary the maximum angle between said axis and the rays passing through said aperture.

4. The method of controlling the brightness of an image formed by an image focusing means transmitting rays of constant intensity while maintaining a universal depth of field and substantial depth of focus which comprises blocking the transmission of rays from the central portion of the focusing means by a mask, screening from the image those transmitted rays passing the mask which do not converge toward the axis of the focusing means on the image side thereof so as to form a hollow ray cone passing through an aperture of a screen, said aperture being axially aligned with and of an area not greater than the area of the mask, said mask being held in fixed spaced relation to said screen and adjacent said focusing means and shifting the position of said screen between said focusing means and the point closest to the focusing means where rays transmitted thereby first pass beyond the axially projected area of said aperture after crossing the axis of the focusing means to vary the maximum angle between said axis and the rays passing through said aperture.

5. The method of controlling the brightness of an image formed by an image focusing means transmitting rays of constant intensity while maintaining a universal depth of field and substantial depth of focus which comprises blocking the transmission of rays from the central portion of the focusing means by a mask disposed on the inner side of the focusing means and concentric therewith, screening from the image those transmitted rays which do not converge toward and intersect the axis of the focusing means on the image side thereof so as to form a hollow ray cone passing through an aperture of a screen, said aperture being axially aligned with and of an area not greater than said mask, the inner and outer bounds of said hollow ray cone being defined by the periphery of the blocked area of said focusing means and the edge of said screen aperture respectively, and varying the area between the inner and outer bounds of the said hollow ray cone by shifting said screen aperture between said focusing means and the point closest to the focusing means where rays transmitted thereby first pass beyond the axially projected area of said aperture after crossing the axis of the focusing means.

6. The method of controlling the brightness of an image formed by an image focusing means transmitting rays of constant intensity while maintaining a universal depth of field and substantial depth of focus which comprises blocking the transmission of rays from the central portion of the focusing means by a mask disposed on the inner side of the focusing means and concentric therewith, screening from the image those transmitted rays which do not converge toward and intersect the axis of the focusing means on the image side thereof so as to form a hollow ray cone passing through an aperture of a screen, said aperture being axially aligned with and of an area not greater than the area of the blocked portion of the focusing means, the inner and outer bounds of said ray cone being defined by border rays converging from the periphery of the blocked area of said focusing means and the edge of said screen aperture respectively and meeting in the image at the farthest point thereof from the image center, and varying the angle between the border rays of the hollow ray cone by shifting said screen aperture between said focusing means and the point closest to the focusing means where rays transmitted thereby first pass beyond the axially projected area of said aperture after crossing the axis of the focusing means.

7. In an image forming system for providing a universal depth of field and substantial depth of focus comprising a focusing means and an image receiving means, a masking member for blocking off the transmission of rays to the image from a concentric portion of said focusing means, a screen member having an aperture axially aligned with the masking member and having a maximum radial dimension not greater than the smallest radial dimension of said masking member, said screen member being positioned between said masking member and the point closest to the focusing means where rays transmitted thereby first pass beyond the axially projected area of said aperture after crossing the axis of the focusing means, and at least one of said members being movable between said point and said focusing means along the optical axis thereof.

8. An image forming system for providing a universal depth of field and substantial depth of focus comprising a focusing lens and an image receiving means, an annular masking member concentric with the optical axis of the lens for preventing light rays from reaching said image receiving means from a concentric portion of said lens, an opaque screen member having an annular aperture concentric with said optical axis, the axially projected area of said aperture having a radial dimension not greater than the radial dimension of said masking member, said screen member being positioned between said masking member and the point closest to the focusing lens where rays transmitted thereby first pass beyond the axially projected area of said aperture after crossing the axis of the focusing means, and at least one of said members being movable between said point and said focusing means along the optical axis thereof.

9. An image forming system for providing a universal depth of field and substantial depth of focus comprising a focusing lens, an image receiving means, an annular opaque mask mounted adjacent the rear surface of said lens concentric with the axis thereof for blocking off the transmission of rays to the image from a concentric portion of said focusing means, an opaque screen having an annular aperture concentric with the lens axis and in a plane normal thereto, said aperture having a diameter not greater than the diameter of said mask, said screen being movable between said mask and the point closest to the focusing lens where rays transmitted thereby first pass beyond the axially projected area of said aperture after crossing the axis of the focusing lens.

10. An image forming system for providing a universal depth of field and substantial depth of focus comprising a focusing lens, an image receiving means spaced from the lens along the optical axis thereof, a screen disposed between the lens and said image receiving means, said screen having an aperture concentric with the optical axis and of an area less than that within the effective diameter of the lens, and a mask mounted on said screen concentric with said aperture and on the side thereof adjacent said lens for blocking off the transmission of rays to the image from a central portion of said lens, said mask being held in spaced relation with the screen and having a minimum radial dimension at least as great as the maximum radial dimension of said aperture and said screen being movable along the optical axis between said lens and the point closest to the lens where rays transmitted thereby first pass beyond the axially projected area of said aperture after crossing the axis of the lens.

11. An image forming system for providing a universal depth of field and substantial depth of focus comprising a focusing lens, a mask mounted concentrically with the lens axis on the front surface of the lens for blocking off the transmission of rays to the image from a concentric portion of said lens, said mask having an aperture therethrough centered on the lens axis, and a screen disposed rearwardly of the lens and having an aperture concentric with the lens axis and of a size such that its axially projected area will fall wholly within the perimeter of said mask, said screen being movable along the lens axis between said lens and the point closest to the lens where rays transmitted thereby first pass beyond the axially projected area of said aperture after crossing the axis of the lens.

References Cited in the file of this patent

UNITED STATES PATENTS

| | | |
|---|---|---|
| 996,888 | Schuele | July 4, 1911 |
| 1,154,232 | Byron | Sept. 21, 1915 |
| 1,784,425 | George | Dec. 9, 1930 |
| 1,813,439 | Coleman | July 7, 1931 |
| 1,993,448 | Huber | Mar. 5, 1935 |
| 2,185,221 | Nakken | Jan. 2, 1940 |
| 2,193,325 | Riszdorfer | Mar. 12, 1940 |
| 2,812,686 | Sinclair | Nov. 12, 1957 |
| 2,838,683 | Munro | June 10, 1958 |
| 2,915,939 | Van Luik | Dec. 8, 1959 |